(12) United States Patent
Sridharan et al.

(10) Patent No.: US 12,542,634 B2
(45) Date of Patent: Feb. 3, 2026

(54) UPLINK DEMODULATION REFERENCE SIGNAL BUNDLING MODES

(71) Applicant: QUALCOMM Incorporated, San Diego, CA (US)

(72) Inventors: Gokul Sridharan, Sunnyvale, CA (US); Hung Dinh Ly, San Diego, CA (US); Mahmoud Taherzadeh Boroujeni, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 919 days.

(21) Appl. No.: 17/738,975

(22) Filed: May 6, 2022

(65) Prior Publication Data
US 2022/0360396 A1 Nov. 10, 2022

Related U.S. Application Data

(60) Provisional application No. 63/185,724, filed on May 7, 2021.

(51) Int. Cl.
  *H04L 5/00* (2006.01)
  *H04L 5/14* (2006.01)
  *H04W 72/044* (2023.01)

(52) U.S. Cl.
CPC .............. *H04L 5/0048* (2013.01); *H04L 5/14* (2013.01); *H04W 72/044* (2013.01)

(58) Field of Classification Search
CPC ... H04L 5/0048; H04L 5/0053; H04L 5/0091; H04L 5/14; H04L 25/22; H04B 3/20; H04Q 3/00; H04W 72/044; H04W 72/0457
See application file for complete search history.

(56) References Cited

U.S. PATENT DOCUMENTS

2021/0143957 A1* 5/2021 Gao ..................... H04L 5/0053
2023/0291523 A1* 9/2023 Hasegawa ............ H04L 5/0044

OTHER PUBLICATIONS

Hasegawa et al. (US 2023/0291523 A1, U.S. Appl. No. 63/061,397) (Year: 2020).*
Hasegawa et al. (US 2023/0291523 A1, U.S. Appl. No. 63/091,454) (Year: 2020).*
Hasegawa et al. (US 2023/0291523 A1, U.S. Appl. No. 63/136,313) (Year: 2021).*

* cited by examiner

*Primary Examiner* — Brian T Le
(74) *Attorney, Agent, or Firm* — Paul M. McAdams; Polsinelli LLP

(57) ABSTRACT

Certain aspects of the present disclosure provide techniques for communicating using DMRS bundling modes. A method that may be performed by a first network node (e.g., a user equipment (UE)) includes transmitting, to a second network node (e.g., a base station (BS) or a portion thereof), capability information indicating a bundling capability of the first network node for one or more demodulation reference signal (DMRS) bundling modes; receiving, based on the capability information, configuration information including an indication of a particular DMRS bundling mode of the one or more DMRS bundling modes; and transmitting bundled DMRSs according to the particular DMRS bundling mode of the one or more DMRS bundling modes. In some cases, the indication included in the configuration information can indicate to perform DMRS bundling according to the particular DMRS bundling mode.

30 Claims, 12 Drawing Sheets

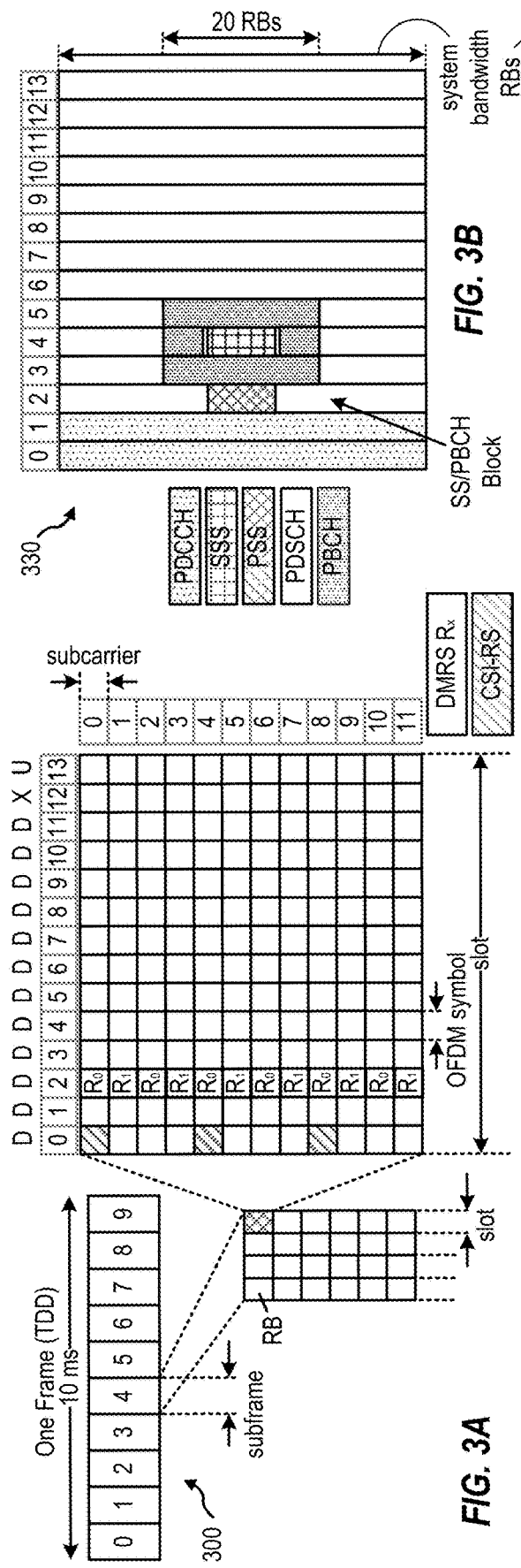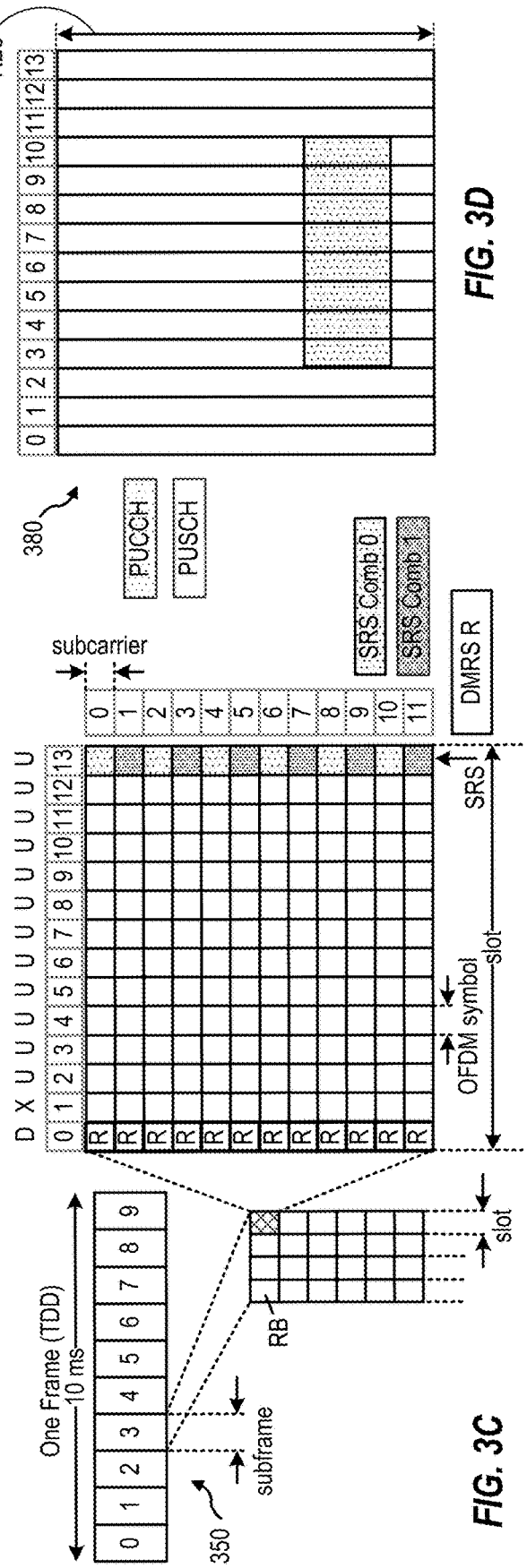

Bundled transmission with gaps

Bundled transmissions with intervening transmissions

UPLINK DEMODULATION REFERENCE SIGNAL BUNDLING MODES

CROSS-REFERENCE TO RELATED APPLICATIONS

This application claims the benefit of U.S. Provisional Application No. 63/185,724, filed May 7, 2021, which is hereby incorporated by reference in its entirety.

INTRODUCTION

Aspects of the present disclosure relate to wireless communications, and more particularly, to techniques for communicating using demodulation reference signal (DMRS) bundling modes.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a first network node (e.g., a base station (BS) or portion thereof). The method generally includes receiving, from a second network node (e.g., a user equipment (UE)), capability information indicating a bundling capability of the second network node for one or more demodulation reference signal (DMRS) bundling modes; transmitting, based on the capability information, configuration information to the second network node including an indication of a particular DMRS bundling mode of the one or more DMRS bundling modes; and receiving bundled DMRSs according to the particular DMRS bundling mode of the one or more DMRS bundling modes.

Certain aspects can be implemented in a method for wireless communication performed by a first network node (e.g., a user equipment (UE)). The method generally includes transmitting, to a second network node (e.g., base station (BS)), capability information indicating a bundling capability of the first network node for one or more demodulation reference signal (DMRS) bundling modes; receiving, based on the capability information, configuration information including an indication of a particular DMRS bundling mode of the one or more DMRS bundling modes; and transmitting bundled DMRSs according to the particular DMRS bundling mode of the one or more DMRS bundling modes.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Figure 1:
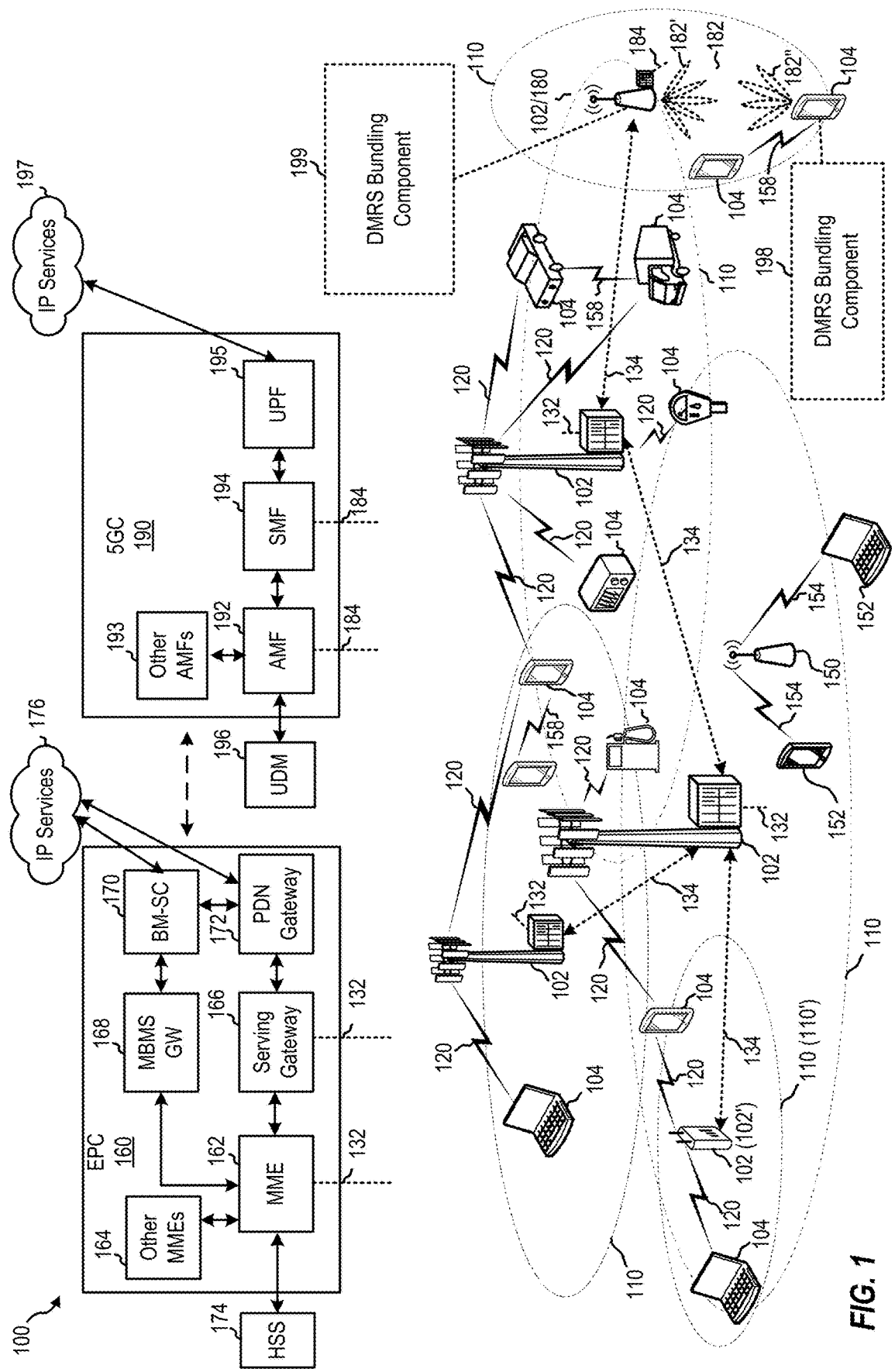
FIG. 1 is a block diagram conceptually illustrating an example wireless communication network.

Aspects of the present disclosure provide apparatuses, methods, processing systems, and computer-readable mediums for communicating using demodulation reference signal (DMRS) bundling modes in a wireless communication network.

Bundling, also known as channel repetition, may refer to a technique where multiple repetitions of a channel, such as an uplink channel or downlink channel, are transmitted by a transmitting device (e.g., a user equipment) to enhance coverage associated with the channel, allowing a receiving device (e.g., a base station) to combine the repetitions to improve decoding of the uplink channel. However, jumps in a transmission phase may occur when repetitions of the uplink channel are transmitted across multiple slots, which may affect an ability of the receiving device to properly estimate and decode the uplink channel. To account for these phase discontinuities, a receiving device would typically use a reference signal from the transmitting device, known as a phase tracking reference signal (PTRS), which tracks a phase of a local oscillator at the transmitting device and/or the receiving device. PTRS may allow the receiving device to correct for the phase discontinuities so that the receiving device may properly estimate and decode the channel based on the repetitions of the uplink channel.

There may be cases where, even in the presence of PTRS, certain base stations may not be able to account for such phase discontinuities. However, the UE may not have a way of knowing whether a particular base station is able to compensate for phase discontinuities. Thus, there may be situations in which the UE performs channel repetition in a manner that leads to phase discontinuities that a base station is not able to compensate for, leading to failed decoding attempts at the base station and poor user experience at the UE. Further, such failed decoding attempts may lead to the UE having to perform one or more retransmissions, resulting in unnecessary power consumption at the UE and wasted time and frequency resources in the wireless communications network.

Thus, aspects of the present disclosure provide techniques for helping to reduce situations in which the UE performs DMRS repetition in a manner that results in phase discontinuities that are not able to be compensated for by a base station or other network node or entity. For example, such techniques may involve the UE providing capability information to the base station indicating a bundling capability of the UE for one or more DMRS bundling modes. In response to receiving the capability information of the UE, the base station may transmit configuration information to the UE including an indication to perform DMRS bundling according to a particular DMRS bundling mode of the one or more DMRS bundling modes, which may be preconfigured by the network or configured as needed, such as through signaling from the network (e.g., from a base station) to the UE.

For example, the base station may specifically configure the UE with a DMRS bundling mode, based on a capability of the base station, that avoid situations in which the UE transmits bundled DMRS in a manner that results in phase discontinuities that cannot be compensated by the base station. Such techniques may reduce the chances of failed decoding attempts at the base station and retransmissions by the UE, thereby conserving power at the UE and time/frequency resources within the wireless communications network.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As used herein, the terms "node", "network node", "network entity", "user equipment" (UE), "base station", etc. are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAE) or drone, helicopter, airship, glider, etc.) and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity or network node can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "node", "network node", "network entity", "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Introduction to Wireless Communication Networks

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a DMRS bundling component 199, which may be configured to communicating using DMRS bundling modes. Wireless communication network 100 further includes a DMRS bundling component 198, which may be used configured to communicating using DMRS bundling modes.

Figure 2:
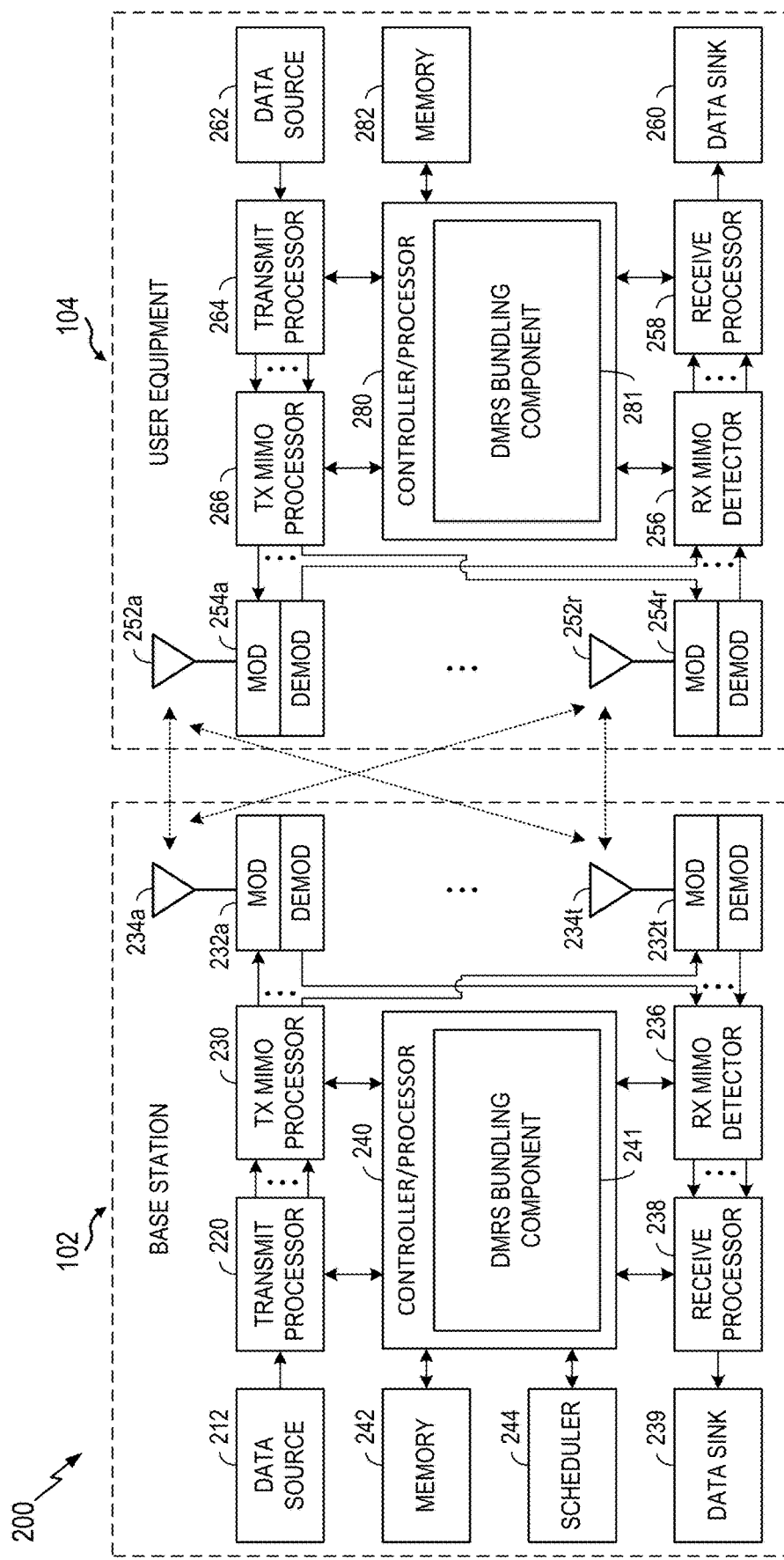
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes DMRS bundling component 241, which may be representative of DMRS bundling component 199 of FIG. 1. Notably, while depicted as an aspect of controller/processor 240, DMRS bundling component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes DMRS bundling component 281, which may be representative of DMRS bundling component 198 of FIG. 1. Notably, while depicted as an aspect of controller/processor 280, DMRS bundling component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a respective plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same.

Similarly, the transmit and receive directions for UE 104 may or may not be the same.

Aspects Related Uplink Demodulation Reference Signal Bundling Modes

In certain wireless communication systems, such as the wireless communication network 100 of FIG. 1, demodulation reference signals (DMRSs) transmitted by a transmitting device (e.g., a user equipment (UE) or other network node or entity, such as a base station (BS)) on a data channel (e.g., physical uplink shared channel (PUSCH) and/or physical downlink shared channel (PDSCH)) may be used to help assist a receiving device (e.g., a base station or UE) in estimating the data channel and demodulating data received on the data channel based on the channel estimation. However, there may be cases in which reception of these DMRSs at the receiving device may be affected, such as when channel conditions are poor, the receiving device is located on a cell edge, and the like. According, in some cases, coverage enhancement techniques may be implemented to provide for better coverage of DMRS.

One such coverage enhancement technique may be known as channel repetition. Generally, channel repetition refers to a technique where multiple repetitions of a channel are transmitted, allowing a receiver to combine the repetitions to facilitate decoding of the channel. In the context of DMRS, channel repetition, or DMRS bundling, may involve a transmitting device transmitting multiple repetitions of a DMRS on data channel in multiple slots. The receiver device may receive the multiple repetitions of the DMRS, combine these multiple repetitions to estimate the data channel over which the DMRS are received (e.g., known as joint channel estimation), and demodulate data corresponding to the DMRS based on the estimated channel.

Figure 4:
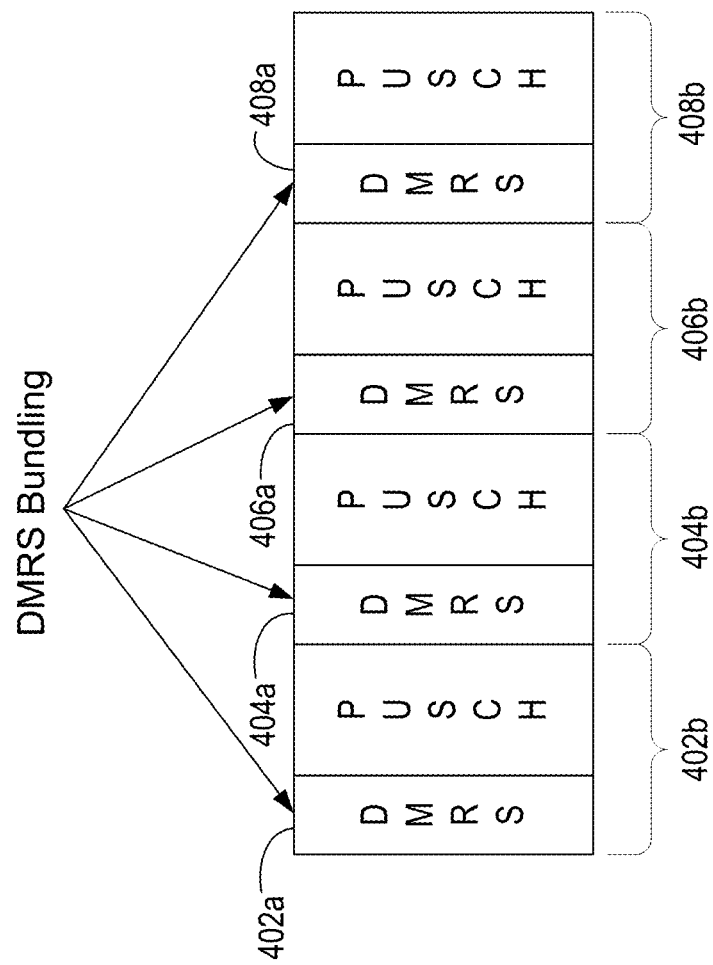
FIG. 4 illustrates demodulation reference signal bundling.

FIG. 4 provides an example illustration of DMRS bundling across multiple slots. For example, as shown, a transmitting device (e.g., UE 104) may transmit a first DMRS 402a in a first slot 402b. Thereafter, the transmitting device may then transmit a second DMRS 404a in slot 404b, a third DMRS 406a in slot 406b, and a fourth DMRS 408a in slot 408b. The second DMRS 404a, the third DMRS 406a, and the fourth DMRS 408a may comprise repetitions of the first DMRS 402a. Additionally, as shown, each DMRS may be associated with a respective data transmission (e.g., PUSCH) in a same slot (e.g., the first DMRS 402a in slot 402b is associated with the PUSCH in slot 402b, the second DMRS 404a in slot 404b is associated with the PUSCH in the slot 404b, etc.). A receiving device (e.g., BS 102) may then receive the first DMRS 402a, the second DMRS 404a, the third DMRS 406a, and the fourth DMRS 408a and perform joint channel estimation based on these DMRSs to decode the associated data transmission (e.g., the first DMRS 402a in slot 402b is used to perform joint channel estimation to decode the PUSCH resource in slot 402b).

Figure 5:
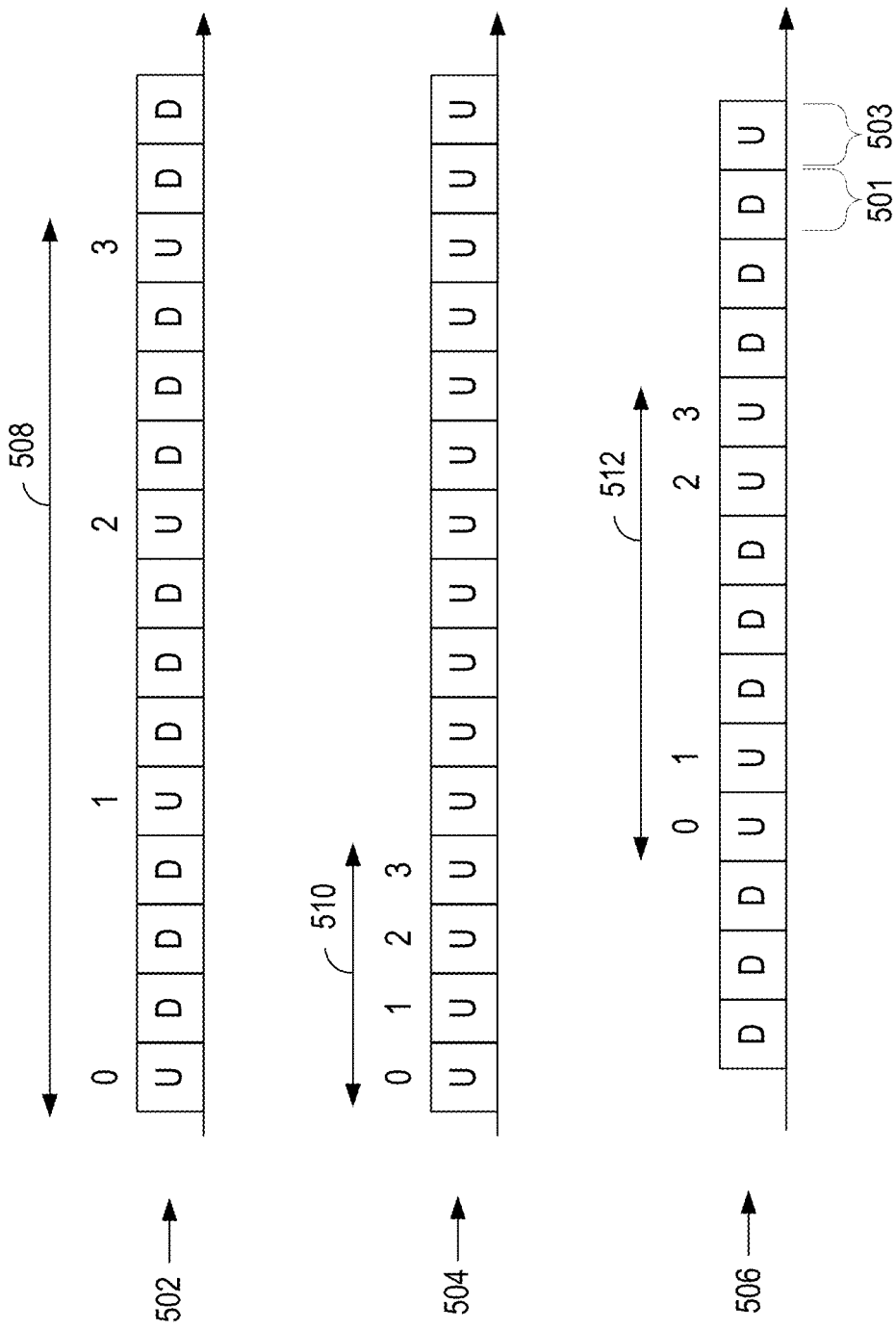
FIG. 5 illustrates demodulation reference signaling bundling for different slot patterns.

In some cases, DMRS bundling may be applied to different slot patterns, as shown in FIG. 5. Each slot pattern illustrated in FIG. 5 may comprise a respective pattern of downlink slots (D) 501 and uplink slots (U) 503 used for carrying downlink signals and uplink signals, respectively. As shown, a first DMRS bundling configuration for a first slot pattern is shown at 502. The first DMRS bundling configuration may involve bundling DMRSs in a DMRS bundling duration (e.g., window) 508 in non-consecutive uplink (U) slots of the first slot pattern. For example, as shown at 502, a transmitting device transmits DMRS #0, DMRS #1, DMRS #2, and DMRS #3 within non-consecutive uplink slots within the bundling duration 508. For example, as shown, each respective DMRS transmission may be separated by a respective number (e.g., 3) of consecutive downlink (D) slots.

A second DMRS bundling configuration for a second slot pattern is shown at 504. The second DMRS bundling configuration may involve bundling DMRSs in a DMRS bundling duration 510 in consecutive uplink (U) slots of the second slot pattern.

For example, as shown at 504, the transmitting device transmits DMRS #0, DMRS #1, DMRS #2, and DMRS #3 within consecutive uplink slots within the bundling duration 510.

A third DMRS bundling configuration for a third slot pattern is shown at 506. The third DMRS bundling configuration may involve bundling DMRSs in a DMRS bundling duration 512 in consecutive uplink slots and non-consecutive uplink slots of the second slot pattern. For example, as shown at 506, the transmitting device transmits DMRS #0 and DMRS #1 in two consecutive uplink slots in the bundling duration 512. The transmissions of DMRS #0 and DMRS #1 may then be followed by a number (e.g., 3) of downlink slots. After the downlink slots, the transmitting device may then transmit DMRS #2 and DMRS #3 in two additional consecutive uplink slots, which, as shown, are not consecutive to the uplink slots in which DMRS #0 and DMRS #1 are transmitted.

Generally, when performing channel repetition, a linear, continuous phase ramp (e.g., increase in phase over time) across all bundled slots (e.g., slots including DMRS repetitions) may be desired. For example, a linear phase ramp ensures that after downconverting the received signal at the receiving device, no residual phase discontinuities due to upconversion at the transmitter are left behind and therefore DMRS across multiple slots can then be used to estimate the underlying wireless channel. However, in some cases, continuity of the phase ramp may not be maintained by the transmitting device (e.g., UE 104), which may result in a phase discontinuity when crossing transmission slot boundaries, known as a phase jump. If there are phase discontinuities during the upconversion process, these phase discontinuities may appears as residual phase discontinuities after down conversion, preventing DMRS across multiple slots to be directly used for estimating the underlying wireless channel. In some cases, discontinuity can occur at different locations as well (e.g., symbol boundaries), depending on the nature of the intervening event. Such phase discontinuity or phase discontinuities may lead to improper DMRS channel estimation and the receiving device not being able to demodulate and decode data associated with the DMRS.

Figure 6:
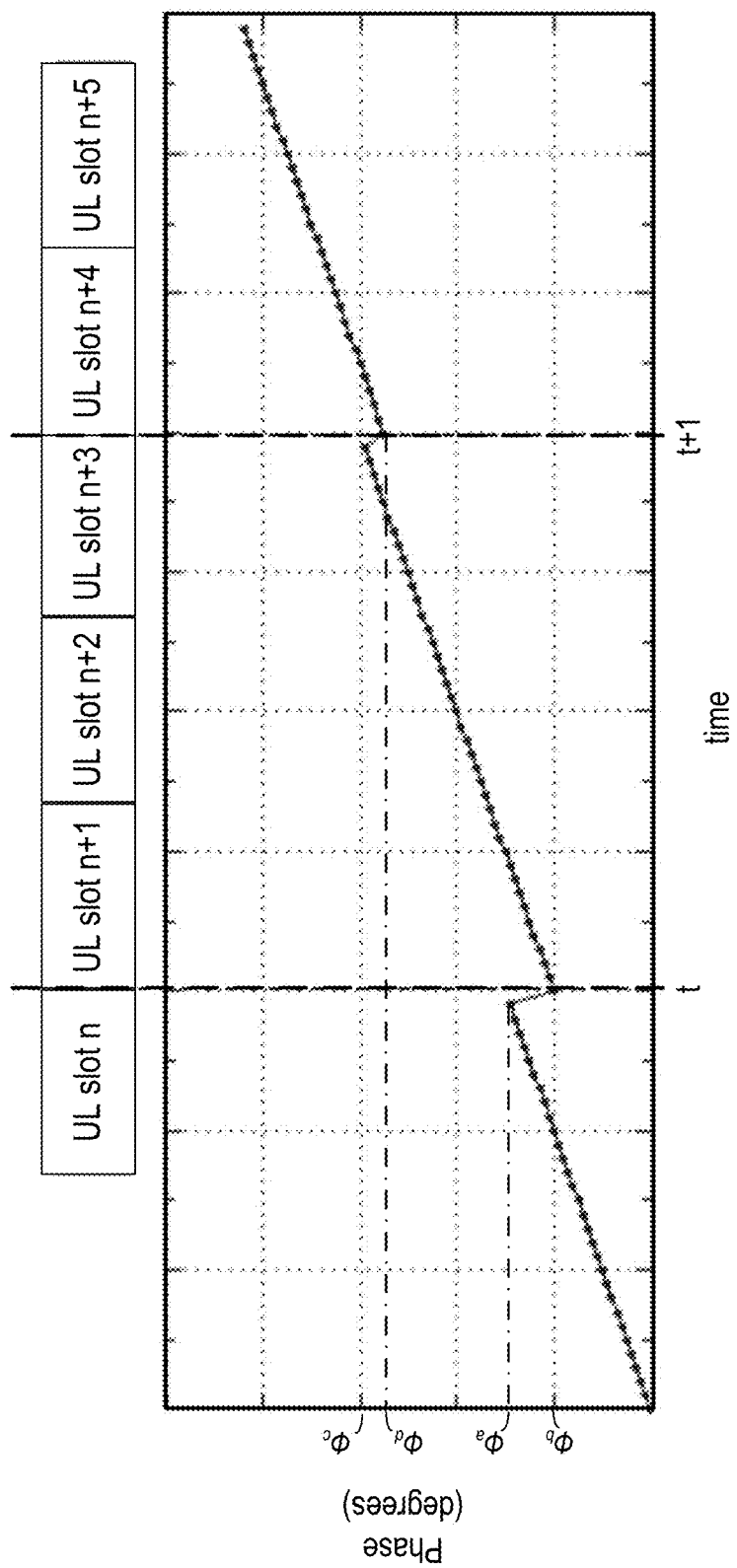
FIG. 6 provides an illustration of phase discontinuities that may occur between transmission slots.

FIG. 6 provides an illustration of phase discontinuities that may occur between transmission slots. As shown in FIG. 6, when performing channel repetition (e.g., DMRS bundling) across multiple transmission slots, a first phase discontinuity (in a number of degrees) occurs at time t between uplink (UL) transmission slot n and UL transmission slot n+1. More specifically, as shown, between UL transmission slot n and UL transmission slot n+1 at time t, the transmission phase may jump from approximately phase $\Phi_a$ to approximately $\Phi_b$. Similarly, as shown, a second phase discontinuity occurs at time t+1 between UL transmission slot n+3 and UL transmission slot n+4. For example, as can be seen, between UL transmission slot n+3 and UL transmission slot n+4, the transmission phase may jump from approximately phase $\Phi_c$ to approximately phase $\Phi_d$.

In some cases, the phase discontinuities illustrated in FIG. 6 may be caused by different transmission scenarios. For example, in the case of PUSCH DMRS bundling, the phase discontinuities may occur due to non-contiguous time resource allocation for PUSCH symbols, a timing gap between PUSCH symbols being greater than a threshold, transmission of other UL channels/signals (e.g., PUCCH, SRS etc.) or DL channels/signals (e.g., PDCCH, PDSCH, SSB, CSI-RS etc.) during these timing gaps, different frequency resource allocation for PUSCH symbols, different transmission powers, different transmission waveforms, and the like.

To account for these phase discontinuities, a receiving device would typically use a reference signal from the transmitting device, known as a phase tracking reference signal (PTRS), which tracks a phase of a local oscillator at the transmitting device and/or the receiving device. PTRS plays a crucial role especially at mmWave frequencies to minimize the effect of the oscillator phase noise on system performance. For example, PTRS may allow the receiving device to compensate for the phase discontinuities introduced by the oscillator of the transmitting device so that the receiving device may properly estimate and decode the channel based on the repetitions of the uplink channel.

Some base stations within a network (e.g., wireless communications network 100 of FIG. 1) may be able to compensate for these phase discontinuities while others may not be able to do so even in the presence of PTRS. Base stations that are not able to compensate for phase discontinuities may require a UE to abide by a strict definition of phase continuity across slots, which prevents the UE from performing DMRS bundling in manners that result in phase discontinuities, such as transmitting DMRS repetitions across non-consecutive slots, which limits the UE's ability to take advantage of DMRS bundling for improved transmission and reception performance.

In some cases, the UE may communicate with a mix of base stations that are able to compensate for such phase discontinuities and base stations that are unable to compensate for such phase discontinuities. However, the UE may not have a way of knowing whether a particular base station is able to compensate for phase discontinuities. Thus, there may be situations in which the UE performs DMRS repetition in a manner that leads to phase discontinuities that a base station is not able to compensate for, leading to failed decoding attempts at the base station and poor user experience at the UE. Further, such failed decoding attempts may lead to the UE having to perform one or more retransmissions, resulting in unnecessary power consumption at the UE and wasted time and frequency resources in the wireless communications network.

Thus, aspects of the present disclosure provide techniques for helping to reduce situations in which the UE performs DMRS repetition in a manner that results in phase discontinuities that are not able to be compensated for by a base station. For example, such techniques may involve the UE providing capability information to the base station indicating a bundling capability of the UE for one or more DMRS bundling modes. The one or more DMRS bundling modes may be defined in terms of whether phase discontinuities are allowed across transmission slot boundaries during transmission of bundled DMRSs. In such cases, the bundling capability of the UE may indicate, for each respective DMRS bundling mode, whether DMRS bundling is only possible across consecutive slots or whether non-consecutive slots may be allowed.

In response to receiving the capability information of the UE, the base station may transmit configuration information to the UE including an indication to perform DMRS bundling according to one or more of DMRS bundling modes. In some cases, the indication to perform DMRS bundling according to a particular DMRS bundling mode may be based on a capability of the base station to account for phase discontinuities across transmission slots. Accordingly, the base station may specifically configure the UE with a DMRS bundling mode, based on a capability of the base station, that avoid situations in which the UE transmits bundled DMRS in a manner that results in phase discontinuities that cannot be compensated by the base station. Such techniques may reduce the chances of failed decoding attempts at the base station and retransmissions by the UE, thereby conserving power at the UE and time/frequency resources within the wireless communications network.

Figure 7:
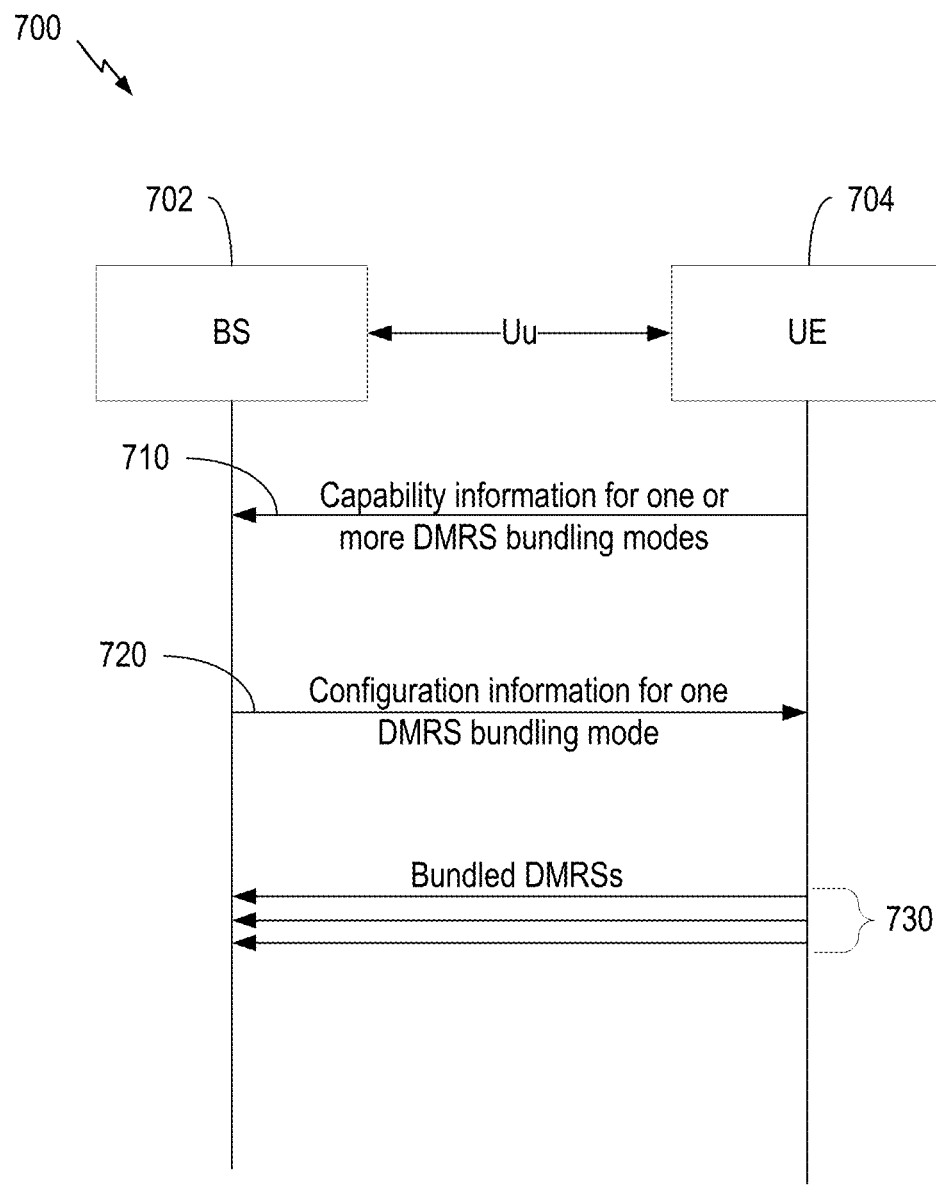
FIG. 7 is a call flow diagram illustrating example operations between a base station and a user equipment for communicating using demodulation reference signals bundling modes.

Example Call Flow Illustrating Operations for Communicating Using DMRS Bundling Modes FIG. 7 is a call flow diagram illustrating example operations 700 between a BS 702 and a UE 704 communicating using DMRS bundling modes. In some cases, the BS 702 may be an example of the BS 102 in the wireless communication network 100 illustrated in FIG. 1. Similarly, the UE 704 may be an example of the UE 104 illustrated in FIG. 1. Further, as shown, a Uu interface may be established to facilitate communication between the BS 702 and UE 704, however, in other aspects, a different type of interface may be used.

As shown, the operations 700 illustrated in FIG. 7 begin at 710 with the UE 704 transmitting, to the BS 702, capability information indicating a bundling capability of the UE for one or more DMRS bundling modes. In some cases, the capability information includes a respective (e.g., separate) bundling capability of the UE for each respective DMRS bundling mode of the one or more DMRS bundling modes.

The one or more DMRS bundling modes may include, for example, a first DMRS bundling mode that disallows phase discontinuities across transmission slot boundaries when transmitting the bundled DMRSs. The first DMRS bundling mode may be the most restrictive and prevent transmitting DMRS in a manner that may result in phase discontinuities across any transmission slot boundaries. For example, with reference to FIG. 5, the first DMRS bundling mode may prevent transmitting DMRS according to the first DMRS bundling configuration shown at 502 and/or the third DMRS bundling configuration shown at 506, as each of these DMRS bundling configurations may include bundling DMRS across non-consecutive transmission slots with intervening downlink transmissions. As described herein, bundling DMRS across non-consecutive transmission slots with intervening downlink transmissions may lead to phase discontinuities. For instance, the first DMRS bundling mode may only allow for bundled DMRS transmission in consecutive transmission slots, such as according to the second DMRS bundling configuration shown at 504.

Additionally, the one or more DMRS bundling modes may include a second DMRS bundling mode that allows phase discontinuities across transmission slot boundaries when transmitting the bundled DMRSs. The second DMRS bundling mode may be the least restrictive, allowing the transmission of bundled DMRS across consecutive and non-consecutive transmission slots. For example, with reference to FIG. 5, the second DMRS bundling mode may allow the transmission of bundled DMRS according the first DMRS bundling configuration shown at 502, the second DMRS bundling configuration shown at 504, and the third DMRS bundling configuration shown at 506.

Additionally, in some cases, the one or more DMRS bundling modes may include a third DMRS bundling mode that allows phase discontinuities across non-consecutive transmission slots when transmitting the bundled DMRSs and disallows phase discontinuities across consecutive transmission slots when transmitting the bundled DMRSs. For example, with reference to FIG. 5, the third DMRS bundling mode may allow the transmission of bundled DMRS according to the third DMRS bundling configuration shown at 506. More specifically, for example, the third DMRS bundling mode may allow for phase discontinuities between transmission of DMRS #1 and DMRS #2 (e.g., which are in non-consecutive transmission slots) but may disallow phase discontinuities between transmission of DMRS #0 and DMRS #1 as well as between DMRS #2 and DMRS #3 (e.g., which are in consecutive transmission slots).

According to aspects, for each respective DMRS bundling mode of the one or more DMRS bundling modes, the bundling capability in the capability information may indicate whether DMRS bundling is only possible across consecutive slots or whether DMRS bundling across non-consecutive slots can be allowed. More generally, the bundling capability in the capability information may indicate that the UE is able to transmit DMRS across different (contiguous/noncontiguous) slots in such a manner (e.g., according to the one or more DMRS bundling modes) that the BS 702 can perform joint channel estimation (JCE) or cross-slot channel estimation (CSCE).

Returning to FIG. 7, after receiving the capability information, the BS 702 transmits at 720, based on the capability information, configuration information including an indication to perform DMRS bundling according to a particular DMRS bundling mode of the one or more DMRS bundling modes, which is received by the UE 704. In some cases, the configuration information may be statically or semi-statically configured and transmitted to the UE 704 radio resource control (RRC) signaling or may be dynamically configured and transmitted to the UE 704 in downlink control information (DCI).

In some cases, the indication to perform DMRS bundling according to the particular DMRS bundling mode may be based on a capability of the BS, such as a capability to account for phase discontinuities across transmission slots associated with the one or more DMRS bundling modes. For example, when the BS 702 is more capable of accounting for phase discontinuities, the BS 702 may transmit configuration information to the UE 704 that indicates to the UE 704 to perform DMRS bundling according to the second DMRS bundling mode or the third DMRS bundling mode, which allow phase discontinuities across transmission slot boundaries. In some cases, however, when the BS 702 is less capable of accounting for phase discontinuities, the BS 702 may transmit configuration information to the UE 704 that indicates to the UE 704 to perform DMRS bundling according to, for example, the first DMRS bundling mode, which prevents phase discontinuities across transmission slot boundaries.

Thereafter, as illustrated at 730, the UE 704 transmits bundled DMRSs according to the DMRS bundling mode indicated in transmission 720. For example, if the configuration information indicates to perform the DMRS bundling according to the first DMRS bundling mode, the UE 704 may transmit DMRS in a manner that results in phase discontinuities across transmission slot boundaries, such as illustrated at 502 and 506 of FIG. 5. The BS 702 may receive the bundled DMRSs, jointly estimate an associated data channel, and demodulate and decode the associated data channel based on the joint channel estimation.

Additional Considerations Regarding the Contents of the Capability Information and Configuration Information As noted above, the bundling capability in the capability information may indicate, for each respective DMRS bundling mode of the one or more DMRS bundling modes, whether DMRS bundling is only possible across consecutive slots or whether DMRS bundling across non-consecutive slots can be allowed. The capability information may also indicate additional information related to DMRS bundling.

In some cases, the additional information included in the capability information may include a respective (e.g., separate) bundling capability of the UE for each respective operating frequency band of the UE. For example, when the UE is capable of operating at a first operating frequency band and a second operating frequency band, the capability information may include a respective (e.g., separate) bundling capability for each respective DMRS bundling mode of the one or more DMRS bundling modes for the first operating frequency band as well as a respective (e.g., separate) bundling capability for each respective DMRS bundling mode of the one or more DMRS bundling modes for the second operating frequency band.

For example, the additional information included in the capability information may include an indication of a bundling duration for each respective DMRS bundling mode of the one or more DMRS bundling modes. The bundling duration is a period of time (e.g., slots, symbols, etc.) in which bundled transmissions (e.g., bundled DMRS) may be transmitted and generally indicates a length of time in which the UE 704 is able to maintain phase continuity when transmitting bundled transmissions. For example, a first bundling duration may correspond to a first set of bundled transmissions while a second bundling duration may correspond to a second set of bundled transmissions.

In some cases, the UE 704 may be able to maintain phase continuity for longer when transmitting bundled DMRS in consecutive slots as compared to in non-consecutive slots. As such, in some cases, the bundling duration for DMRS bundling modes where DMRS bundling across non-consecutive slots is prohibited, such as in the second DMRS bundling mode, may be larger than the bundling duration for DMRS bundling modes where DMRS bundling across non-consecutive slots is permitted, such as in the first DMRS bundling mode. In some cases, based on the reported bundling duration, the BS 702 may select a bundling duration for transmitting the bundled DMRSs and may indicate the selected bundling duration to the UE 704 in the configuration information received at 720.

Additionally, in some cases, the UE 704 may provide, for each respective DMRS bundling mode for the one or more DMRS bundling modes, an indication in the capability information of a supported modulation order supported for the respective DMRS bundling mode. For example, the UE 704 may indicate a first supported modulation order (e.g., quadrature phase shift keying (QPSK)) for the first DMRS bundling mode while indicating a second supported modulation order (e.g., 256 quadrature amplitude modulation (QAM)) for the second DMRS bundling mode. Further, in some cases, the UE 704 may also indicate a bundling duration for each supported modulation order indicated in the capability information.

Impacts on UE Behavior

Figure 8A:
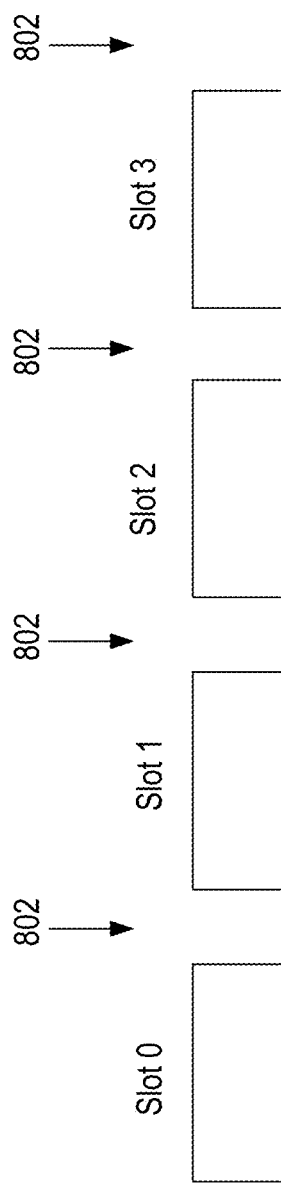
FIGS. 8A and 8B illustrate transmission gaps and intervening transmissions between bundled demodulation reference signal transmissions.

In some cases, whether phase discontinuities are permitted or not may have certain impacts on UE behavior. For example, in certain cases, when phase discontinuities are permitted, the UE may allow for gaps between transmission slots in which bundled DMRSs are transmitted. For example, as illustrated in FIG. 8A, the bundled DMRSs (e.g., transmitted by the UE 704 at 730 in FIG. 7) may be transmitted in slot 0, slot 1, slot 2, and slot 3, each of which may be separated by a transmission gap 802. These transmission gaps 802 may provide the UE 704 with more flexibility when transmitting bundled DMRSs and certain other benefits. For example, in some cases, during these transmission gaps 802, the UE 704 may be able to turn off radio frequency (RF) circuitry, such as a phase locked loop (PLL) or a power amplifier of the UE 704, allowing the UE 704 to conserve power.

Figure 8B:
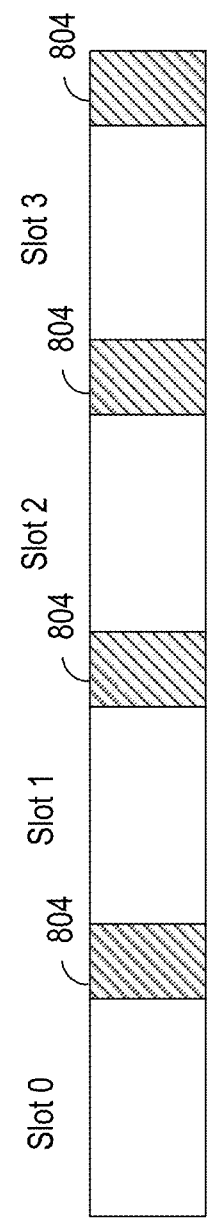

In some cases, to provide the UE 704 with more flexibility, one or more intervening transmissions may be transmitted or received in the transmission gaps 802, allowing the UE 704 to more efficiently use network resources and improve throughput. For example, as illustrated in FIG. 8B, the bundled DMRSs transmitted by the UE 704 at 730 may be transmitted in slot 0, slot 1, slot 2, and slot 3, each of which may be separated by a transmission gap. However, in contrast to FIG. 8A, one or more intervening transmissions 804 may be scheduled in these transmission gaps. The one or more intervening transmissions 804 may include at least one of downlink transmissions received by the UE 704 or uplink transmissions transmitted by the UE 704. In some cases, when transmitting or receiving the one or more intervening transmissions 804, the UE 704 may retune a transmit/receive chain to a different frequency, address the intervening transmission, and thereafter return back to an original frequency for transmitting the bundled DMRSs.

Additional Considerations Regarding the DMRS Bundling Modes

In some cases, depending on the configured DMRS bundling mode, different sets of rules may apply to transmitting the bundled DMRSs and handling intervening transmissions.

A first rule may relate to whether a UE is permitted to perform one or more intervening uplink transmissions between transmission of the bundled DMRSs. As an example, the first DMRS bundling mode may allow the UE to perform the one or more intervening uplink transmissions between the bundled DMRSs while the second DMRS bundling mode may not allow the UE to perform the one or more intervening uplink transmissions between the bundled DMRS, such as the one or more intervening transmissions 804 illustrated in FIG. 8B. Accordingly, when the configured DMRS bundling mode received in the configuration information at 720 of FIG. 7 permits the UE 704 to transmit the one or more intervening uplink transmissions between transmission of the bundled DMRS, the operations 700 may further include the UE 704 transmitting the one or more intervening uplink transmissions between the bundled DMRSs transmitted at 730, such as the one or more intervening transmissions 804 illustrated in FIG. 8B.

Similarly, a second rule may relate to whether the UE is permitted to receive one or more intervening downlink transmissions between transmission of the bundled DMRSs. As an example, the first DMRS bundling mode may allow a UE to receive the one or more intervening downlink transmissions between the bundled DMRSs while the second DMRS bundling mode may not allow the UE to receive the one or more intervening downlink transmissions between the bundled DMRS. Accordingly, when the configured DMRS bundling mode received in the configuration information at 720 of FIG. 7 permits the UE 704 to receive the one or more intervening downlink transmissions between transmission of the bundled DMRS, the operations 700 may further include the UE 704 receiving the one or more intervening downlink transmissions between the bundled DMRSs transmitted at 730, such as the one or more intervening transmissions 804 illustrated in FIG. 8B.

In some cases, a third rule may relate to power and frequency allocations for the one or more DMRS bundling modes. More specifically, each respective DMRS bundling mode of the one or more DMRS bundling modes may define constraints on power and frequency allocations for intervening transmissions between the bundled DMRSs. For example, the first DMRS bundling mode may define a first transmission power and frequency for receiving/transmitting the intervening transmissions between the bundled DMRSs while the second DMRS bundling mode may define a second transmission power and frequency for receiving/transmitting the intervening transmissions between the bundled DMRSs. In some cases, the transmission power and frequency for the intervening transmissions may be different than a transmission power and/or frequency used for transmitting the bundled DMRSs.

In some cases, a fourth rule may relate to priority of bundling or joint channel estimation over other events such as a PUCCH overlapping with a PUSCH or a higher priority PUSCH overlapping with a lower priority PUSCH and the like. For example, assume there is a sequence of bundled uplink transmissions, such as S0, S1, and S2. In some cases, there may be some time gaps between these transmissions. In these time gaps, the UE can potentially engage in other intervening uplink transmissions, such as P0, which may fall between S0 and S1. In such cases, there may be a question regarding what the impact of P0 is on the sequence of bundled uplink transmissions S0, S1, and S2. If an architecture of the UE is such that intervening uplink transmission cannot be accommodated across the sequence of bundled uplink transmissions, one or more priority rules may be defined to handle the intervening uplink transmissions, which may be DMRS bundling mode dependent.

Accordingly, in some cases, each respective DMRS bundling mode of the one or more DMRS bundling modes may define a prioritization or priority rule between transmission of the bundled DMRSs and transmission or reception of one or more intervening transmissions. For example, certain intervening transmissions may have higher priority than the bundled DMRSs. In such cases, depending on the DMRS bundling mode, a UE may be permitted to "break" the bundling by transmitting the higher priority intervening transmission between the bundled DMRSs. For example, the first DMRS bundling mode may permit high-priority intervening transmissions to be performed between transmission of the bundled DMRSs while prohibiting low-priority intervening transmissions.

In some cases, the bundling capability of the UE for the one or more DMRS bundling modes depends on a time division duplex (TDD) slot configuration associated with the bundled DMRS transmissions. For example, in some cases, the first DMRS bundling may support a first TDD slot configuration (e.g., the second slot configuration illustrated at 504 in FIG. 5) while not supporting a second TDD slot configuration (e.g., the first slot configuration illustrated at 502 in FIG. 5). Additionally, in some cases, TDD slot configurations may change periodically. If the slot configuration changes, the UE 704 may report a change in the bundling capability for each respective DMRS bundling mode of the one or more DMRS bundling modes, which may be helpful if the UE 704 is capable of supporting certain DMRS bundling modes for certain TDD slot configurations but not others.

Example Methods for Communicating Using DMRS Bundling Modes

Figure 9:
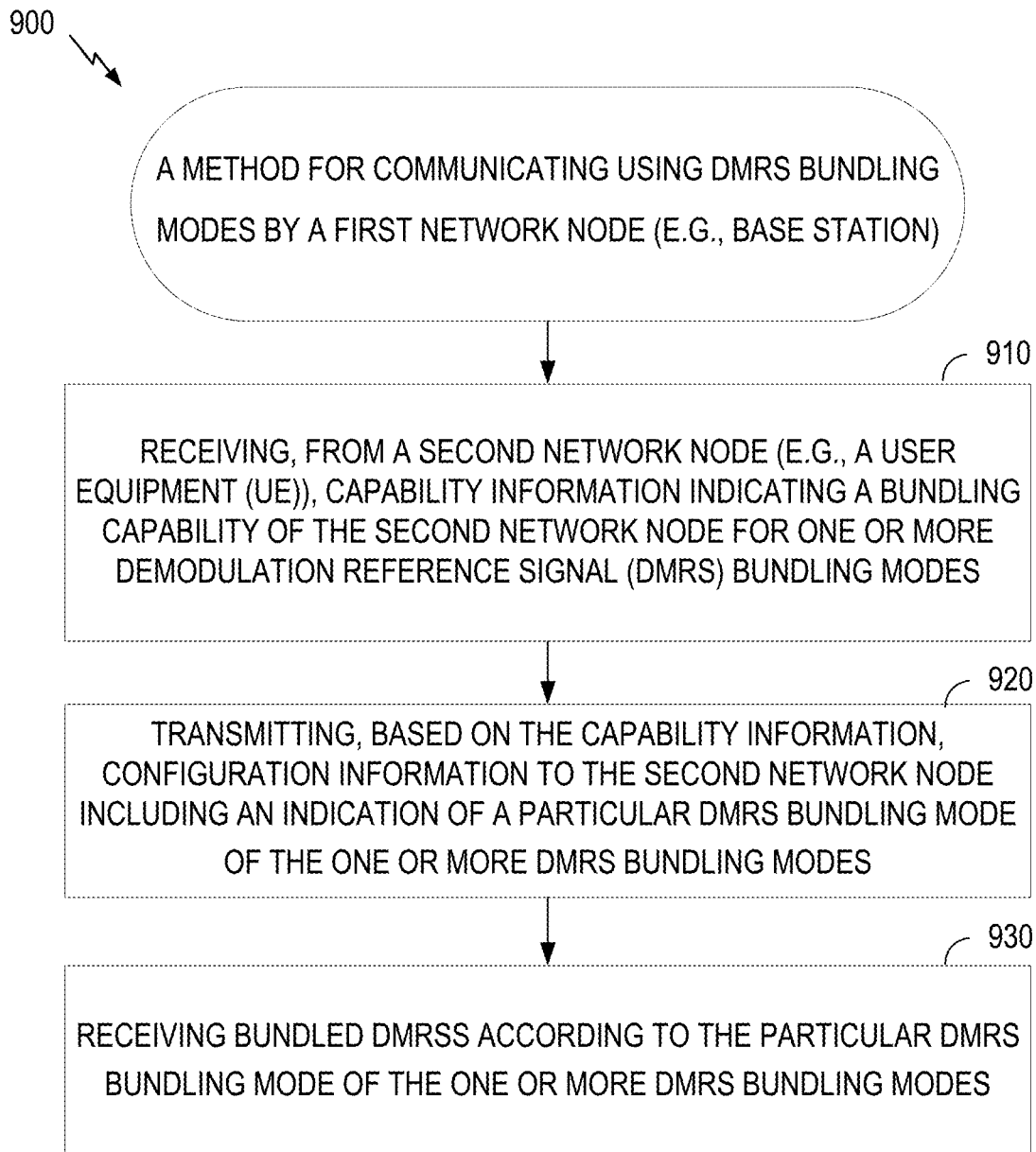
FIG. 9 is a flow diagram illustrating example operations for wireless communication by a network node (e.g., a base station or portion thereof).

FIG. 9 is a flow diagram illustrating example operations 900 for wireless communication. The operations 900 may be performed, for example, by a first network node (e.g., a base station (BS), such as the BS 102 in the wireless communication network 100 of FIG. 1, or a portion of the base station, such as a CU, DU, RU, Near-RT RIC, and/or Non-RT RIC of the base station) for communicating using DMRS bundling modes. While the description of the operations 900 of FIG. 9 will be described using a BS as an example of the first network node, the operations 900 may be performed by another type of network node. The operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240, including the DMRS bundling component 241) obtaining and/or outputting signals.

The operations 900 begin at 910 with receiving, from a second network node (e.g., a user equipment (UE)), capability information indicating a bundling capability of the second network node (e.g., UE) for one or more demodulation reference signal (DMRS) bundling modes. While the description of the operations 900 of FIG. 9 will be described using a UE as an example of the second network node, the operations 900 may be performed with respect to another type of network node.

At block 920, the BS transmits, based on the capability information, configuration information to the UE including an indication of a particular DMRS bundling mode of the one or more DMRS bundling modes. In some cases, the indication included in the configuration information can indicate to perform DMRS bundling according to the particular DMRS bundling mode. In some examples, the indication to perform DMRS bundling according to the particular DMRS bundling mode is based on a capability of the BS. In some cases, the capability of the BS comprises a capability to account for phase discontinuities across transmission slots associated with the one or more DMRS bundling modes.

At block 930, the BS receives bundled DMRSs according to the particular DMRS bundling mode of the one or more DMRS bundling modes.

In some cases, the capability information includes a respective (e.g., separate) bundling capability of the UE for each respective DMRS bundling mode of the one or more DMRS bundling modes.

In some cases, the one or more DMRS bundling modes include at least one of: a first DMRS bundling mode that disallows phase discontinuities across transmission slot boundaries when transmitting the bundled DMRSs; a second DMRS bundling mode that allows phase discontinuities across transmission slot boundaries when transmitting the bundled DMRSs; or a third DMRS bundling mode that allows phase discontinuities across non-consecutive transmission slots when transmitting the bundled DMRSs and disallows phase discontinuities across consecutive transmission slots when transmitting the bundled DMRSs. In some aspects, the particular DMRS bundling mode is the first DMRS bundling mode. In some aspects, the particular DMRS bundling mode is the second DMRS bundling mode. In some aspects, the particular DMRS bundling mode is the third DMRS bundling mode.

In some cases, the capability information further includes a respective indication of a respective bundling duration for each respective DMRS bundling mode of the one or more DMRS bundling modes.

In some cases, the capability information further includes, for each respective DMRS bundling mode of the one or more DMRS bundling modes, a respective indication of a respective supported modulation order supported for each respective DMRS bundling mode.

In some cases, the capability information further includes a respective indication of a respective bundling duration for each respective supported modulation order indicated in the capability information.

In some cases, the configuration information further includes an indication of a bundling duration for the particular DMRS bundling mode.

In some cases, the capability information includes a respective (e.g., separate) bundling capability of the UE for each respective operating frequency band of the UE.

In some cases, the configuration information is transmitted in at least one of radio resource control (RRC) signaling or in downlink control information (DCI).

In some cases, the one or more DMRS bundling modes indicate whether the UE is permitted to perform one or more intervening uplink transmissions between transmission of two or more DMRSs of the bundled DMRSs. In such cases, the operations 900 may further include receiving the one or more intervening uplink transmissions when the particular DMRS bundling mode permits the UE to transmit the one or more intervening uplink transmissions between transmission of the two or more DMRSs of the bundled DMRS.

In some cases, the one or more DMRS bundling modes indicate whether the UE is permitted to receive one or more intervening downlink transmissions between transmission of two or more DMRSs of the bundled DMRSs. In such cases, the operations 900 may further include transmitting the one or more intervening downlink transmissions when the particular DMRS bundling mode permits the UE to receive the one or more intervening downlink transmissions between transmission of the two or more DMRSs of the bundled DMRS.

In some cases, each respective DMRS bundling mode of the one or more DMRS bundling modes defines constraints on power and frequency allocations for intervening transmissions between two or more DMRSs of the bundled DMRSs.

In some cases, each respective DMRS bundling mode of the one or more DMRS bundling modes defines a prioritization between transmission of the bundled DMRSs and transmission or reception of one or more intervening transmissions between two or more DMRSs of the bundled DMRSs.

In some cases, the bundling capability of the UE for the one or more DMRS bundling modes depends on a time division duplex (TDD) slot configuration.

Figure 10:
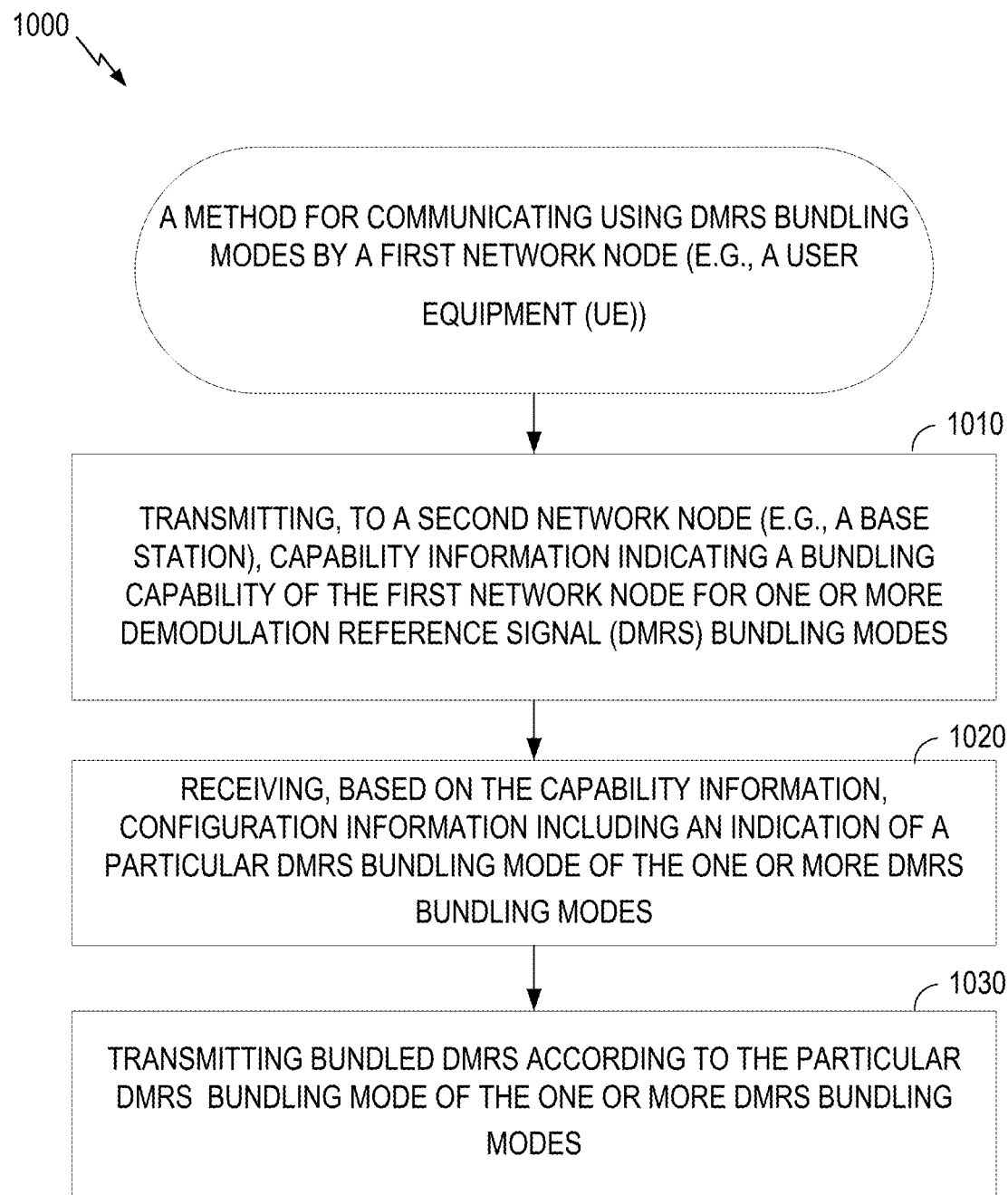
FIG. 10 is a flow diagram illustrating example operations for wireless communication by a network node (e.g., a user equipment).

FIG. 10 is a flow diagram illustrating example operations 1000 for wireless communication, in accordance with certain aspects of the present disclosure. The operations 1000 may be performed, for example, by a first network node (e.g., a UE, such as the UE 104 in the wireless communication network 100 of FIG. 1) for communicating using DMRS bundling modes. While the description of the operations 900 of FIG. 9 will be described using a UE as an example of the first network node, the operations 900 may be performed by another type of network node. The operations 1000 may be complementary to the operations 900 performed by the BS. The operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the DMRS bundling component 281) obtaining and/or outputting signals.

The operations 1000 begin, in block 1010, with transmitting, to a second network node (e.g., a base station (BS) or portion of the BS, such as a CU, DU, RU, Near-RT RIC, and/or Non-RT RIC of the BS), capability information indicating a bundling capability of the UE for one or more demodulation reference signal (DMRS) bundling modes. While the description of the operations 900 of FIG. 9 will be described using a BS as an example of the second network node, the operations 900 may be performed with respect to another type of network node.

In block 1020, the UE receives, based on the capability information, configuration information including an indication of a particular DMRS bundling mode of the one or more DMRS bundling modes. In some cases, the indication included in the configuration information can indicate to perform DMRS bundling according to the particular DMRS bundling mode. In some examples, the indication to perform DMRS bundling according to the particular DMRS bundling mode is based on a capability of the BS. In some cases, the capability of the BS comprises a capability to account for phase discontinuities across transmission slots associated with the one or more DMRS bundling modes.

In block 1030, the UE transmits bundled DMRSs according to the particular DMRS bundling mode.

In some cases, the capability information includes a respective (e.g., separate) bundling capability of the UE for each respective DMRS bundling mode of the one or more DMRS bundling modes.

In some cases, the one or more DMRS bundling modes include at least one of: a first DMRS bundling mode that disallows phase discontinuities across transmission slot boundaries when transmitting the bundled DMRSs; a second DMRS bundling mode that allows phase discontinuities across transmission slot boundaries when transmitting the bundled DMRSs; or a third DMRS bundling mode that allows phase discontinuities across non-consecutive transmission slots when transmitting the bundled DMRSs and disallows phase discontinuities across consecutive transmission slots when transmitting the bundled DMRSs. In some aspects, the particular DMRS bundling mode is the first DMRS bundling mode. In some aspects, the particular DMRS bundling mode is the second DMRS bundling mode. In some aspects, the particular DMRS bundling mode is the third DMRS bundling mode.

In some cases, the capability information further includes a respective indication of a respective bundling duration for each respective DMRS bundling mode of the one or more DMRS bundling modes.

In some cases, the capability information further includes, for each respective DMRS bundling mode for the one or more DMRS bundling modes, a respective indication of a respective supported modulation order supported for each respective DMRS bundling mode.

In some cases, the capability information further includes a respective indication of a respective bundling duration for each respective supported modulation order indicated in the capability information.

In some cases, the configuration information further includes an indication of a bundling duration for the particular DMRS bundling mode.

In some cases, the capability information includes a respective (e.g., separate) bundling capability of the UE for each respective operating frequency band of the UE.

In some cases, the configuration information is received in at least one of radio resource control (RRC) signaling or in downlink control information (DCI).

In some cases, the one or more DMRS bundling modes indicate whether the UE is permitted to perform one or more intervening uplink transmissions between transmission of two or more DMRSs of the bundled DMRSs. In such cases, the operations 1000 may further include transmitting the one or more intervening uplink transmissions when the particular DMRS bundling mode permits the UE to transmit the one or more intervening uplink transmissions between transmission of the two or more DMRSs of the bundled DMRS.

In some cases, the one or more DMRS bundling modes indicate whether the UE is permitted to receive one or more intervening downlink transmissions between transmission of two or more DMRSs of the bundled DMRSs. In such cases, the operations 1000 may further include receiving the one or more intervening downlink transmissions when the particular DMRS bundling mode permits the UE to receive the one or more intervening downlink transmissions between transmission of the two or more DMRSs of the bundled DMRS.

In some cases, each respective DMRS bundling mode of the one or more DMRS bundling modes defines constraints on power and frequency allocations for intervening transmissions between two or more DMRSs of the bundled DMRSs.

In some cases, each respective DMRS bundling mode of the one or more DMRS bundling modes defines a prioritization between transmission of the bundled DMRSs and transmission or reception of one or more intervening transmissions between two or more DMRSs of the bundled DMRSs.

In some cases, the bundling capability of the UE for the one or more DMRS bundling modes depends on a time division duplex (TDD) slot configuration.

Example Wireless Communication Devices

Figure 11:
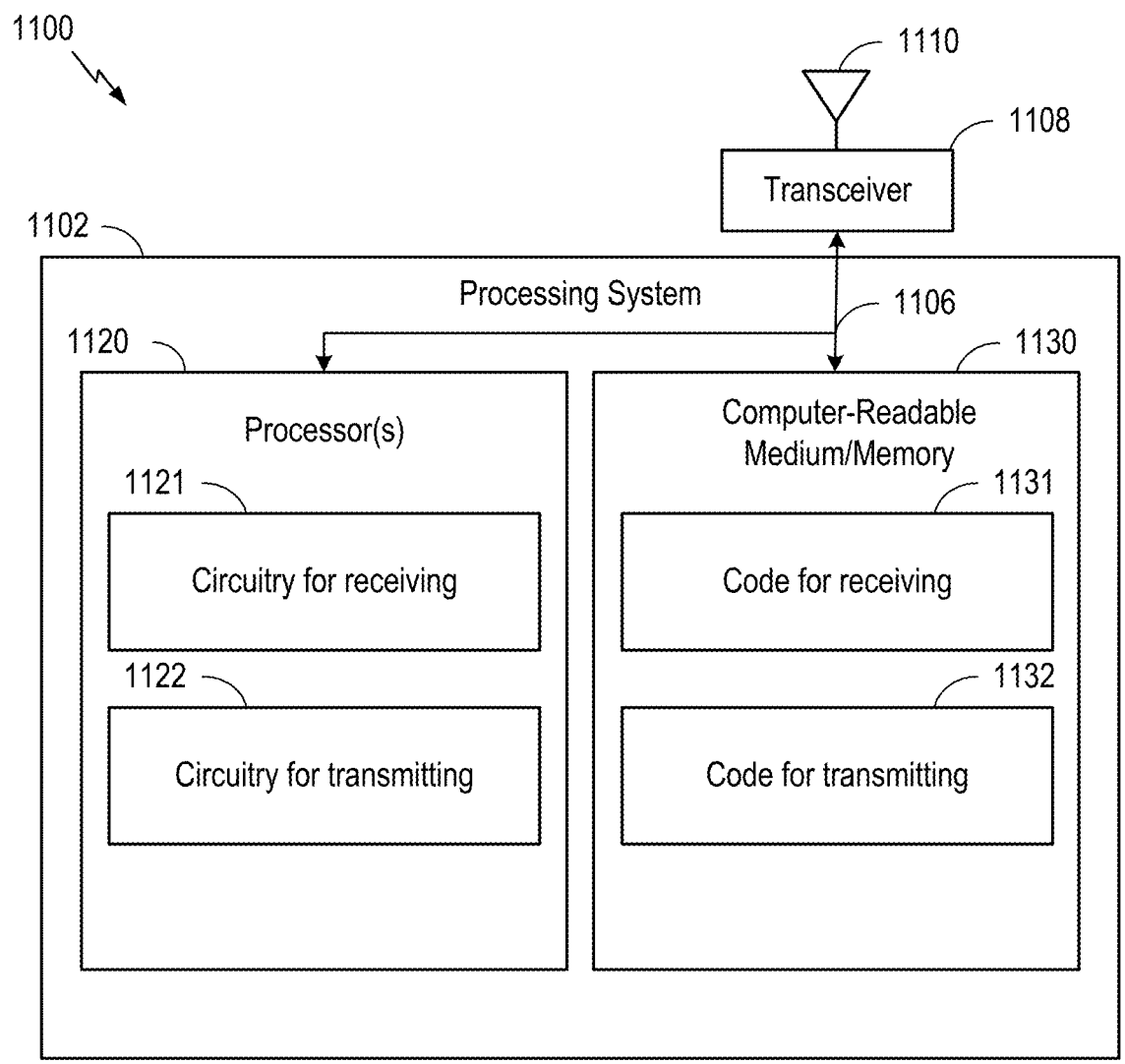
FIGS. 11 and 12 depict aspects of example communications devices.

FIG. 11 depicts an example communications device 1100 that includes various components operable, configured, or adapted to perform operations for the techniques disclosed herein, such as the operations depicted and described with respect to FIG. 7 and FIG. 9. In some examples, communication device 1100 may be a base station 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIG. 7 and FIG. 9, or other operations for performing the various techniques discussed herein for communicating using DMRS bundling modes.

In the depicted example, computer-readable medium/memory 1130 stores code 1131 for receiving and code 1132 for transmitting.

In the depicted example, the one or more processors 1120 include circuitry configured to implement the code stored in the computer-readable medium/memory 1130, including circuitry 1121 for receiving and circuitry 1122 for transmitting.

Various components of communications device 1100 may provide means for performing the methods described herein, including with respect to FIG. 7 and FIG. 9.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

Notably, FIG. 11 is just one example, and many other examples and configurations of communication device 1100 are possible.

Figure 12:
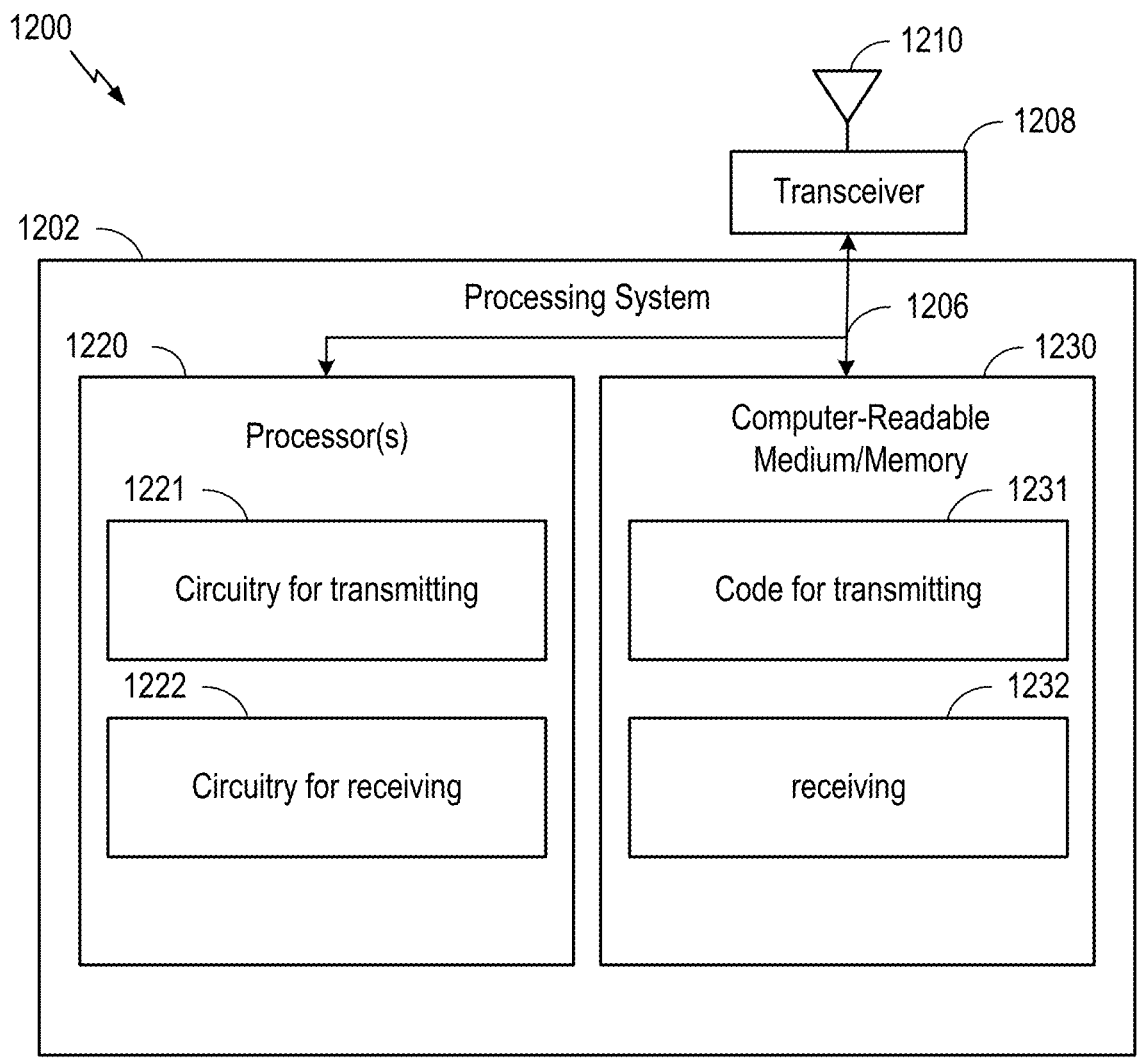

FIG. 12 depicts an example communications device 1200 that includes various components operable, configured, or adapted to perform operations for the techniques disclosed herein, such as the operations depicted and described with respect to FIGS. 7 and 10. In some examples, communication device 1200 may be a user equipment 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 7 and 10, or other operations for performing the various techniques discussed herein for communicating using DMRS bundling modes.

In the depicted example, computer-readable medium/memory 1230 stores code 1231 for transmitting and code 1232 for receiving.

In the depicted example, the one or more processors 1220 include circuitry configured to implement the code stored in the computer-readable medium/memory 1230, including circuitry 1221 for transmitting and circuitry 1222 for receiving.

Various components of communications device 1200 may provide means for performing the methods described herein, including with respect to FIGS. 7 and 10.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

Notably, FIG. 12 is just one example, and many other examples and configurations of communication device 1200 are possible.

Example Clauses

Implementation examples are described in the following numbered clauses:

Clause 1: A method for wireless communication by a user equipment (UE), comprising: transmitting, to a base station (BS), capability information indicating a bundling capability of the UE for one or more demodulation reference signal (DMRS) bundling modes; receiving, based on the capability information, configuration information including an indication to perform DMRS bundling according to one DMRS bundling mode of the one or more DMRS bundling modes; and transmitting bundled DMRSs according to the one DMRS bundling mode.

Clause 2: The method of Clause 1, wherein the capability information includes a separate bundling capability of the UE for each DMRS bundling mode of the one or more DMRS bundling modes.

Clause 3: The method of any one of Clauses 1-2, wherein the one or more DMRS bundling modes include at least one of: a first DMRS bundling mode that disallows phase discontinuities across transmission slot boundaries when transmitting the bundled DMRSs; a second DMRS bundling mode that allows phase discontinuities across transmission slot boundaries when transmitting the bundled DMRSs; or a third DMRS bundling mode that allows phase discontinuities across non-consecutive transmission slots when transmitting the bundled DMRSs and disallows phase discontinuities across consecutive transmission slots when transmitting the bundled DMRSs.

Clause 4: The method of any of Clauses 1-3, wherein the capability information further includes an indication of a bundling duration for each of the one or more DMRS bundling modes.

Clause 5: The method of any one of Clauses 1-4, wherein the capability information further includes, for each respective DMRS bundling mode for the one or more DMRS bundling modes, an indication of a supported modulation order supported for the respective DMRS bundling mode.

Clause 6: The method of Clause 5, wherein the capability information further includes an indication of a bundling duration for each supported modulation order indicated in the capability information.

Clause 7: The method of any one of Clauses 1-6, wherein the configuration information further includes an indication of a bundling duration for the one DMRS bundling mode.

Clause 8: The method of any one of Clauses 1-7, wherein the indication to perform DMRS bundling according to one DMRS bundling mode is based on a capability of the BS.

Clause 9: The method of Clause 8, wherein the capability of the BS comprises a capability to account for phase discontinuities across transmission slots associated with the one or more DMRS bundling modes.

Clause 10: The method of any one of Clauses 1-9, wherein the capability information includes a separate bundling capability of the UE for each operating frequency band of the UE.

Clause 11: The method of any one of Clauses 1-10, wherein the configuration information is received in at least one of radio resource control (RRC) signaling or in downlink control information (DCI).

Clause 12: The method of any one of Clauses 1-11, wherein: the one or more DMRS bundling modes indicate whether the UE is permitted to perform one or more intervening uplink transmissions between transmission of the bundled DMRSs; and the method further comprises transmitting the one or more intervening uplink transmissions when the one DMRS bundling mode permits the UE to transmit the one or more intervening uplink transmissions between transmission of the bundled DMRS.

Clause 13: The method of any one of Clauses 1-12, wherein: the one or more DMRS bundling modes indicate whether the UE is permitted to receive one or more intervening downlink transmissions between transmission of the bundled DMRSs; and the method further comprises receiving the one or more intervening downlink transmissions when the one DMRS bundling mode permits the UE to receive the one or more intervening downlink transmissions between transmission of the bundled DMRS.

Clause 14: The method of any one of Clauses 1-13, wherein each DMRS bundling mode of the one or more DMRS bundling modes defines constraints on power and frequency allocations for intervening transmissions between the bundled DMRSs.

Clause 15: The method of any one of Clauses 1-14, wherein each DMRS bundling mode of the one or more DMRS bundling modes defines a prioritization between transmission of the bundled DMRSs and transmission or reception of one or more intervening transmissions.

Clause 16: The method of any one of Clauses 1-15, wherein the bundling capability of the UE for the one or more DMRS bundling modes depends on a time division duplex (TDD) slot configuration.

Clause 17: A method for wireless communication by a base station (BS), comprising: receiving, from a user equipment (UE), capability information indicating a bundling capability of the UE for one or more demodulation reference signal (DMRS) bundling modes; transmitting, based on the capability information, configuration information to the UE including an indication to perform DMRS bundling according to one DMRS bundling mode of the one or more DMRS bundling modes; and receiving bundled DMRSs according to the one DMRS bundling mode.

Clause 18: The method of Clause 17, wherein the capability information includes a separate bundling capability of the UE for each DMRS bundling mode of the one or more DMRS bundling modes.

Clause 19: The method of any one of Clauses 17-18, wherein the one or more DMRS bundling modes include at least one of: a first DMRS bundling mode that disallows phase discontinuities across transmission slot boundaries when transmitting the bundled DMRSs; a second DMRS bundling mode that allows phase discontinuities across transmission slot boundaries when transmitting the bundled DMRSs; or a third DMRS bundling mode that allows phase discontinuities across non-consecutive transmission slots when transmitting the bundled DMRSs and disallows phase discontinuities across consecutive transmission slots when transmitting the bundled DMRSs.

Clause 20: The method of any one of Clauses 17-19, wherein the capability information further includes an indication of a bundling duration for each of the one or more DMRS bundling modes.

Clause 21: The method of any one of Clauses 17-20, wherein the capability information further includes, for each respective DMRS bundling mode for the one or more DMRS bundling modes, an indication of a supported modulation order supported for the respective DMRS bundling mode.

Clause 22: The method of Clause 21, wherein the capability information further includes an indication of a bundling duration for each supported modulation order indicated in the capability information.

Clause 23: The method of any one of Clauses 17-22, wherein the configuration information further includes an indication of a bundling duration for the one DMRS bundling mode.

Clause 24: The method of any one of Clauses 17-23, wherein the indication to perform DMRS bundling according to one DMRS bundling mode is based on a capability of the BS.

Clause 25: The method of Clause 24, wherein the capability of the BS comprises a capability to account for phase discontinuities across transmission slots associated with the one or more DMRS bundling modes.

Clause 26: The method of any one of Clauses 17-25, wherein the capability information includes a separate bundling capability of the UE for each operating frequency band of the UE.

Clause 27: The method of any one of Clauses 17-26, wherein the configuration information is received in at least one of radio resource control (RRC) signaling or in downlink control information (DCI).

Clause 28: The method of any one of Clauses 17-27, wherein: the one or more DMRS bundling modes indicate whether the UE is permitted to perform one or more intervening uplink transmissions between transmission of the bundled DMRSs; and the method further comprises receiving the one or more intervening uplink transmissions when the one DMRS bundling mode permits the UE to transmit the one or more intervening uplink transmissions between transmission of the bundled DMRS.

Clause 29: The method of any one of Clauses 17-28, wherein: the one or more DMRS bundling modes indicate whether the UE is permitted to receive one or more intervening downlink transmissions between transmission of the bundled DMRSs; and the method further comprises transmitting the one or more intervening downlink transmissions when the one DMRS bundling mode permits the UE to receive the one or more intervening downlink transmissions between transmission of the bundled DMRS.

Clause 30: The method of any one of Clauses 17-29, wherein each DMRS bundling mode of the one or more DMRS bundling modes defines constraints on power and frequency allocations for intervening transmissions between the bundled DMRSs.

Clause 31: The method of any one of Clauses 17-30, wherein each DMRS bundling mode of the one or more DMRS bundling modes defines a prioritization between transmission of the bundled DMRSs and transmission or reception of one or more intervening transmissions.

Clause 32: The method of anyone of Clauses 17-31, wherein the bundling capability of the UE for the one or more DMRS bundling modes depends on a time division duplex (TDD) slot configuration.

Clause 33: An apparatus, comprising: a memory comprising executable instructions; one or more processors configured to execute the executable instructions and cause the apparatus to perform a method in accordance with any one of Clauses 1-32.

Clause 34: An apparatus, comprising means for performing a method in accordance with any one of Clauses 1-32.

Clause 35: A non-transitory computer-readable medium comprising executable instructions that, when executed by one or more processors of an apparatus, cause the apparatus to perform a method in accordance with any one of Clauses 1-32.

Clause 36: A computer program product embodied on a computer-readable storage medium comprising code for performing a method in accordance with any one of Clauses 1-32.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/ duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/ symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating using DMRS bundling modes in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The methods disclosed herein comprise one or more steps or actions for achieving the methods. The method steps and/or actions may be interchanged with one another without departing from the scope of the claims. For example, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network node for wireless communication, comprising:
    at least one memory; and
    at least one processor coupled to the at least one memory, wherein the at least one processor is configured to:
        transmit capability information indicative of a bundling capability of the network node for one or more demodulation reference signal (DMRS) bundling modes;
        receive, based on the capability information, configuration information including an indication of a particular DMRS bundling mode of the one or more DMRS bundling modes, wherein the particular DMRS bundling mode indicates whether the network node is permitted to at least one of transmit one or more intervening uplink transmissions or receive one or more intervening downlink transmissions between transmission of two or more DMRSs of bundled DMRSs;
        transmit the bundled DMRSs according to the particular DMRS bundling mode of the one or more DMRS bundling modes; and
        at least one of transmit the one or more intervening uplink transmissions or receive the one or more intervening downlink transmissions based on the particular DMRS bundling mode indicating that the network node is permitted to at least one of transmit the one or more intervening uplink transmissions or receive the one or more intervening downlink transmissions between the transmission of the two or more DMRSs of the bundled DMRSs.

2. The network node of claim 1, wherein the capability information includes a respective bundling capability of the network node for each respective DMRS bundling mode of the one or more DMRS bundling modes.

3. The network node of claim 1, wherein the one or more DMRS bundling modes include at least one of:
    a first DMRS bundling mode that disallows phase discontinuities across transmission slot boundaries when transmitting the bundled DMRSs;

a second DMRS bundling mode that allows phase discontinuities across transmission slot boundaries when transmitting the bundled DMRSs; or a third DMRS bundling mode that allows phase discontinuities across non-consecutive transmission slots when transmitting the bundled DMRSs and disallows phase discontinuities across consecutive transmission slots when transmitting the bundled DMRSs.

4. The network node of claim 3, wherein the particular DMRS bundling mode is the first DMRS bundling mode.

5. The network node of claim 3, wherein the particular DMRS bundling mode is the second DMRS bundling mode.

6. The network node of claim 3, wherein the particular DMRS bundling mode is the third DMRS bundling mode.

7. The network node of claim 1, wherein the capability information further includes a respective indication of a respective bundling duration for each respective DMRS bundling mode of the one or more DMRS bundling modes.

8. The network node of claim 1, wherein the capability information further includes, for each respective DMRS bundling mode of the one or more DMRS bundling modes, a respective indication of a respective supported modulation order supported for each respective DMRS bundling mode.

9. The network node of claim 8, wherein the capability information further includes a respective indication of a respective bundling duration for each respective supported modulation order indicated in the capability information.

10. The network node of claim 1, wherein the configuration information further includes an indication of a bundling duration for the particular DMRS bundling mode.

11. The network node of claim 1, wherein the capability information includes a respective bundling capability of the network node for each respective operating frequency band of the network node.

12. The network node of claim 1, wherein, to receive the configuration information, the at least one processor is configured to receive the configuration information in at least one of radio resource control (RRC) signaling or in downlink control information (DCI).

13. The network node of claim 1, wherein each respective DMRS bundling mode of the one or more DMRS bundling modes corresponds to power constraints and frequency allocations for intervening transmissions between the two or more DMRSs of the bundled DMRSs.

14. The network node of claim 1, wherein each respective DMRS bundling mode of the one or more DMRS bundling modes corresponds to a prioritization between transmission of the bundled DMRSs and transmission or reception of one or more intervening transmissions between the two or more DMRSs of the bundled DMRSs.

15. The network node of claim 1, wherein the bundling capability of the network node for the one or more DMRS bundling modes depends on a time division duplex (TDD) slot configuration.

16. The network node of claim 1, wherein the network node is a user equipment (UE), and further comprising:
at least one transceiver, wherein:
to transmit the capability information, the at least one processor is configured to cause the at least one transceiver to transmit the capability information,
to receive the configuration information, the at least one processor is configured to receive the configuration information via the transceiver, and
to transmit the bundled DMRSs, the at least one processor is configured to cause the at least one transceiver to transmit the bundled DMRSs.

17. The network node of claim 1, wherein the network node is a first network node, and wherein, to transmit the capability information, the at least one processor is configured to transmit the capability information to a second network node, and wherein the second network node is:
a base station; or
a central unit (CU), a distributed unit (DU), a remote/radio unit (RU), a Near-Real Time (Near-RT) RAN Intelligent Controller (RIC), or a Non-Real Time (Non-RT) RIC.

18. A first network node for wireless communication, comprising:
at least one memory; and
at least one processor coupled to the at least one memory, the at least one processor configured to:
receive, from a second network node, capability information indicating a bundling capability of the second network node for one or more demodulation reference signal (DMRS) bundling modes;
transmit, based on the capability information, configuration information to the second network node, the configuration information including an indication of a particular DMRS bundling mode of the one or more DMRS bundling modes, wherein the particular DMRS bundling mode indicates at least one of whether the second network node is permitted to transmit one or more intervening uplink transmissions between transmission of two or more DMRSs of the bundled DMRSs or receive one or more intervening downlink transmissions between transmission of the two or more DMRSs of the bundled DMRSs;
receive bundled DMRSs according to the particular DMRS bundling mode of the one or more DMRS bundling modes; and
at least one of receive the one or more intervening uplink transmissions or transmit the one or more intervening downlink transmissions based on the particular DMRS bundling mode indicating that the second network node is permitted to at least one of transmit the one or more intervening uplink transmissions or receive the one or more intervening downlink transmissions between the transmission of the two or more DMRSs of the bundled DMRSs.

19. The first network node of claim 18, wherein the capability information includes at least one of:
a respective bundling capability of the second network node for each respective DMRS bundling mode of the one or more DMRS bundling modes;
a respective indication of a respective bundling duration for each respective DMRS bundling mode of the one or more DMRS bundling modes;
for each respective DMRS bundling mode for the one or more DMRS bundling modes, a respective indication of a respective supported modulation order supported for each respective DMRS bundling mode;
a respective indication of a respective bundling duration for each respective supported modulation order indicated in the capability information; or
a respective bundling capability of the second network node for each respective operating frequency band of the second network node.

20. The first network node of claim 18, wherein the one or more DMRS bundling modes include at least one of:
a first DMRS bundling mode that disallows phase discontinuities across transmission slot boundaries when transmitting the bundled DMRSs;

a second DMRS bundling mode that allows phase discontinuities across transmission slot boundaries when transmitting the bundled DMRSs; or a third DMRS bundling mode that allows phase discontinuities across non-consecutive transmission slots when transmitting the bundled DMRSs and disallows phase discontinuities across consecutive transmission slots when transmitting the bundled DMRSs.

21. The first network node of claim 20, wherein the particular DMRS bundling mode is one of the first DMRS bundling mode, second DMRS bundling mode, or third DMRS bundling mode.

22. The first network node of claim 18, wherein the configuration information further includes an indication of a bundling duration for the particular DMRS bundling mode.

23. The first network node of claim 18, wherein each respective DMRS bundling mode of the one or more DMRS bundling modes corresponds to power constraints and frequency allocations for intervening transmissions between the two or more DMRSs of the bundled DMRSs.

24. The first network node of claim 18, wherein the bundling capability of the second network node for the one or more DMRS bundling modes depends on a time division duplex (TDD) slot configuration.

25. The first network node of claim 18, wherein the first network node is a base station or a central unit (CU), a distributed unit (DU), a remote/radio unit (RU), a Near-Real Time (Near-RT) RAN Intelligent Controller (RIC), or a Non-Real Time (Non-RT) RIC, and further comprising:
at least one transceiver, wherein:
to receive the capability information, the at least one processor is configured to receive the capability information via at least one transceiver,
to transmit the configuration information, the at least one processor is configured to cause the at least one transceiver to transmit the configuration information, and
to receive the bundled DMRSs, the at least one processor is configured to receive the bundled DMRSs via at least one transceiver.

26. The first network node of claim 18, wherein the second network node is a user equipment (UE).

27. The first network node of claim 18, wherein, to receive the configuration information, the at least one processor is configured to receive the configuration information in at least one of radio resource control (RRC) signaling or in downlink control information (DCI).

28. The first network node of claim 18, wherein each respective DMRS bundling mode of the one or more DMRS bundling modes corresponds to a prioritization between transmission of the bundled DMRSs and transmission or reception of one or more intervening transmissions between the two or more DMRSs of the bundled DMRSs.

29. A method for wireless communication at a first network node, comprising:
transmitting, to a second network node, capability information indicating a bundling capability of the first network node for one or more demodulation reference signal (DMRS) bundling modes;
receiving, based on the capability information, configuration information including an indication of a particular DMRS bundling mode of the one or more DMRS bundling modes, wherein the particular DMRS bundling mode indicates whether the network node is permitted to at least one of transmit one or more intervening uplink transmissions or receive one or more intervening downlink transmissions between transmission of two or more DMRSs of bundled DMRSs;
transmitting the bundled DMRSs according to the particular DMRS bundling mode of the one or more DMRS bundling modes; and
at least one of transmitting the one or more intervening uplink transmissions or receiving the one or more intervening downlink transmissions based on the particular DMRS bundling mode indicating that the network node is permitted to at least one of transmit the one or more intervening uplink transmissions or receive the one or more intervening downlink transmissions between the transmission of the two or more DMRSs of the bundled DMRSs.

30. A method for wireless communication by a first network node, comprising:
receiving, from a second network node, capability information indicating a bundling capability of the second network node for one or more demodulation reference signal (DMRS) bundling modes;
transmitting, based on the capability information, configuration information to the second network node including an indication of a particular DMRS bundling mode of the one or more DMRS bundling modes, wherein the particular DMRS bundling mode indicates at least one of whether the second network node is permitted to transmit one or more intervening uplink transmissions between transmission of two or more DMRSs of the bundled DMRSs or receive one or more intervening downlink transmissions between transmission of the two or more DMRSs of the bundled DMRSs;
receiving bundled DMRSs according to the particular DMRS bundling mode of the one or more DMRS bundling modes; and
at least one of receiving the one or more intervening uplink transmissions or transmitting the one or more intervening downlink transmissions based on the particular DMRS bundling mode indicating that the second network node is permitted to at least one of transmit the one or more intervening uplink transmissions or receive the one or more intervening downlink transmissions between the transmission of the two or more DMRSs of the bundled DMRSs.

* * * * *